(12) United States Patent
Defoort

(10) Patent No.: US 9,503,584 B2
(45) Date of Patent: Nov. 22, 2016

(54) SECURE DATA ENTRY SYSTEM

(71) Applicant: BRITISH TELECOMMUNICATIONS PUBLIC LIMITED COMPANY, London (GB)

(72) Inventor: Steven Defoort, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/772,647

(22) PCT Filed: Jan. 23, 2014

(86) PCT No.: PCT/GB2014/000023
§ 371 (c)(1),
(2) Date: Sep. 3, 2015

(87) PCT Pub. No.: WO2014/135825
PCT Pub. Date: Sep. 12, 2014

(65) Prior Publication Data
US 2016/0014278 A1    Jan. 14, 2016

(30) Foreign Application Priority Data
Mar. 4, 2013   (EP) ..................................... 13250022

(51) Int. Cl.
*H04M 11/00*    (2006.01)
*H04M 7/00*    (2006.01)
(Continued)

(52) U.S. Cl.
CPC ........... *H04M 7/0078* (2013.01); *G06Q 30/04* (2013.01); *H04L 63/18* (2013.01); *H04M 3/42059* (2013.01); *H04M 3/5183* (2013.01); *H04M 7/1295* (2013.01); *H04M 2203/609* (2013.01)

(58) Field of Classification Search
CPC ......... H04M 15/765; H04M 15/7652; H04M 15/854; H04M 17/02; H04M 17/00; H04M 17/103; H04M 1/24; H04M 2017/12; H04M 3/248; H04M 15/00; H04M 15/8083; H04M 2215/0176; H04L 12/66
USPC .............. 379/114.01, 142.05, 142.17, 93.01, 379/93.02, 93.03, 93.04, 93.05, 93.07, 379/93.11, 93.12, 93.22, 100.12; 705/14.05, 14.17, 14.26, 14.41, 34, 44, 705/304
See application file for complete search history.

(56) References Cited

U.S. PATENT DOCUMENTS 6,084,953 A * 7/2000 Bardenheuer ..... H04M 3/42195
                                                            379/111
6,483,909 B1 * 11/2002 Khuc ...................... H04M 1/24
                                                            379/1.02
(Continued)

FOREIGN PATENT DOCUMENTS

GB    2 468 739        9/2010
WO    WO 2009/036798   3/2009
WO    WO 2009/136163   11/2009

OTHER PUBLICATIONS

International Search Report for PCT/GB2014/000023, mailed Apr. 22, 2014, 3 pages.

*Primary Examiner* — Binh Tieu
(74) *Attorney, Agent, or Firm* — Nixon & Vanderhye P.C.

(57) ABSTRACT

Data signals (e.g DTMF tones) transmitted on a telephone call between a customer terminal (1) and a call center platform (4) are diverted at the call center platform 4 to a secure payment system (3) such that the call center operative cannot intercept them. In order to verify that this has been done, the security system provides access to the user over a connection (23,230) independant of the connection (34,41) to the call center that allows the user to independently verify that the secure connection 34 has been made. This may take the form of returning the user's calling line identity (CLI) for the connection (34) over the independant connection (23/230) or, where CLI is not available, transmitting a one-time code over one of the links for the user to return over the other. The customer can continue to talk to the call center operative as only DTMF tones are diverted. The call center operative can confirm that the customer's details have been entered and verified by the security system (but is not told what the verification details are) over a separate link (43) between the call center platform (4) and security system (3).

10 Claims, 4 Drawing Sheets

(51) Int. Cl.
*H04L 29/06* (2006.01)
*H04M 3/51* (2006.01)
*H04M 7/12* (2006.01)
*G06Q 30/04* (2012.01)
*H04M 3/42* (2006.01)

(56) References Cited

U.S. PATENT DOCUMENTS

| | | | |
|---|---|---|---|
| 6,999,750 B2 * | 2/2006 | Aoyama | H04L 12/66 379/114.2 |
| 7,224,783 B2 * | 5/2007 | Creamer | G06Q 20/102 379/127.01 |
| 7,409,049 B2 * | 8/2008 | Dassow | H04M 3/38 379/100.06 |
| 8,219,488 B2 * | 7/2012 | Barry | G06Q 20/02 705/26.1 |
| 9,275,222 B2 * | 3/2016 | Yang | G06F 21/55 |
| 2002/0059146 A1 * | 5/2002 | Keech | G06Q 20/02 705/64 |
| 2011/0123008 A1 | 5/2011 | Sarnowski | |

* cited by examiner

SECURE DATA ENTRY SYSTEM

This application is the U.S. national phase of International Application No. PCT/GB2014/000023 filed 23 Jan. 2014 which designated the U.S. and claims priority to EP Patent Application No. 1350022.4 filed 4 Mar. 2013, the entire contents of each of which are hereby incorporated by reference.

BACKGROUND AND SUMMARY

This invention relates to secure payment systems, of the kind used by call centres to take payment details for goods and services ordered by telephone.

Existing systems are known which ensure that the caller giving the payment details is authorised to use the account for which he is giving the details. This is conventionally done by requiring the payer to supply details such as a password or security code which would only be known to the account holder but can be checked by the retailer or call centre operative against a database. However, there is at present no way for the payer (account holder) to know whether or not he is disclosing his credit card details to a trusted individual in a trusted organisation, nor whether the amount he intends to pay is indeed the amount that would be withdrawn from his credit card and actually paid/be destined for the company from which he wishes to obtain services.

It is known from United Kingdom patent GB2473376 (Semafone) to intercept and modify DTMF tones on the fly so that they cannot be intercepted by call centre agents. If such a system were used by the call centre, its operatives would be unable to intercept the data. When a transaction is to be performed, the agent goes into a secure mode, e.g. by entering a special code on his or her terminal. This triggers DTMF tones delivered from the customer to be intercepted at the retailer platform and forwarded to the secure system, without being displayed on the agent's terminal. Use of this system allows the retailer to ensure that its operatives cannot have access to data that they could subsequently misuse, thereby enabling the retailer to be satisfied that they have a secure system in place. However, the caller (buyer) has no way of knowing if he is dealing with a genuine call agent and whether the call agent is actually securing the call during the payment transaction rather than merely pretending to do so, whilst in reality the caller's details are being captured and a different transaction is being dealt with.

There is therefore a need for a system that allows a caller to ascertain whether his call is indeed secured, and that any supplied credit card information is not being stored or disclosed at the merchants call center or by the call center agent.

It is therefore desirable to provide a method by which a caller can ascertain that a voice call is going through trusted payment supplier before conveying credit card details, by providing a service platform to which both the payer and the payee have access, such that the payer can provide secure payment data to the service platform and the service platform provides confirmation to the payee that a payment has been made, without the payee having access to the payer's security information. It is also desirable that the payer can satisfy himself, independently of any assurances from the payee's agent, that such a process is in operation.

According to the invention, there is provided a data security platform for processing data signals carried on a telephone call, having a first data interface for receiving and transmitting data signals to and from a first data connection, and a second data interface for receiving data signals from a second data connection separate from the first data connection, and a third data interface for receiving and transmitting data signals to and from a third data connection, the data security platform having a connection management system responsive to commands received over the first data connection to establish a second data connection, and for generating an output for transmission over the third data connection indicative of the existence of the second data connection.

According to another aspect, there is provided a method of processing data signals carried on a telephone call, wherein data signals are transmitted between a security system and a first termination over a first data connection, wherein the first termination transmits command data to the security system to establish a second data connection between the security system and a second termination, the second data connection being routed by way of the first termination, the second data connection being a telephone connection arranged to carry data signals, wherein the security system is arranged to generate an output on a third data connection independant of the first termination indicative of the existence of the second data connection.

Initiating the trust verification process from the caller end relies on the fact that the caller would in advance know how to verify if his communication channel is indeed secured. (It would defeat the object to have the call centre agent communicate the web address during the call). Instead, a trusted organisation such as the user's own bank or credit card company would inform the user of availability of the service, and the process for accessing the security system using its website's universal resource locator ("url") for example when the service is first introduced, or when the user opens an account with the bank. The same security system would be available for verifying transactions between the user and any call centre system making use of the system.

In one embodiment, the connection management system is arranged to identify a calling line identity of the second data connection and output the calling line identity over the third data connection. In an alternative embodiment, the connection management system is arranged to transmit a challenge message over the second data connection, and to receive a response to the challenge message over the third data connection (or vice versa), the response being indicative that the termination of the second connection and the termination of the third connection are under the control of the same person. The third data connection may be an Internet connection or a telephone connection suitable for carrying DTMF tones.

The platform is intended to be used in a system in which the first data connection and the second data connection are both connected to a first termination point, the second data connection being arranged by the first termination point to be securely forwarded from a second termination point such that it cannot be intercepted at the first termination point.

The invention allows a user, via a second communication means, to get a positive confirmation that the call is indeed secured, and he can be kept informed by the secure system of the progress and content of the payment being transacted, rather than relying on the assurances of an unknown call centre agent. This second communication means can be a website known in advance to the user, or a second call to a number known in advance to the user. Using that second communication means, the user can interrogate the secure payment system if there is a transaction running for him and follow the progress of that transaction in real time. The second call can be made on a separate network connection, or the user may use the same network connection as he is using for talking to the call centre operative, putting the operative on hold whilst carrying out the transaction.

In the event of users calling from corporate networks, a variant can be provided in which the user goes to the same website, and when it indicates that calling line is not known, system then generates a random code which the user then types on his telephone keypad (or hold phone to PC microphone). The secure system listens to this code on the voice call on the part coming from the end-user (not on the part coming from the agent) and as such the system can know whether it is indeed a call that is being secured by it or not.

Alternatively, the user could press an access code, the system could speak a few random digits which the user then types in on the website.

BRIEF DESCRIPTION OF THE DRAWINGS

An embodiment of the invention will now be described, with reference to the drawings, in which.

DETAILED DESCRIPTION OF PRESENT EXAMPLE EMBODIMENTS

Figure 1:
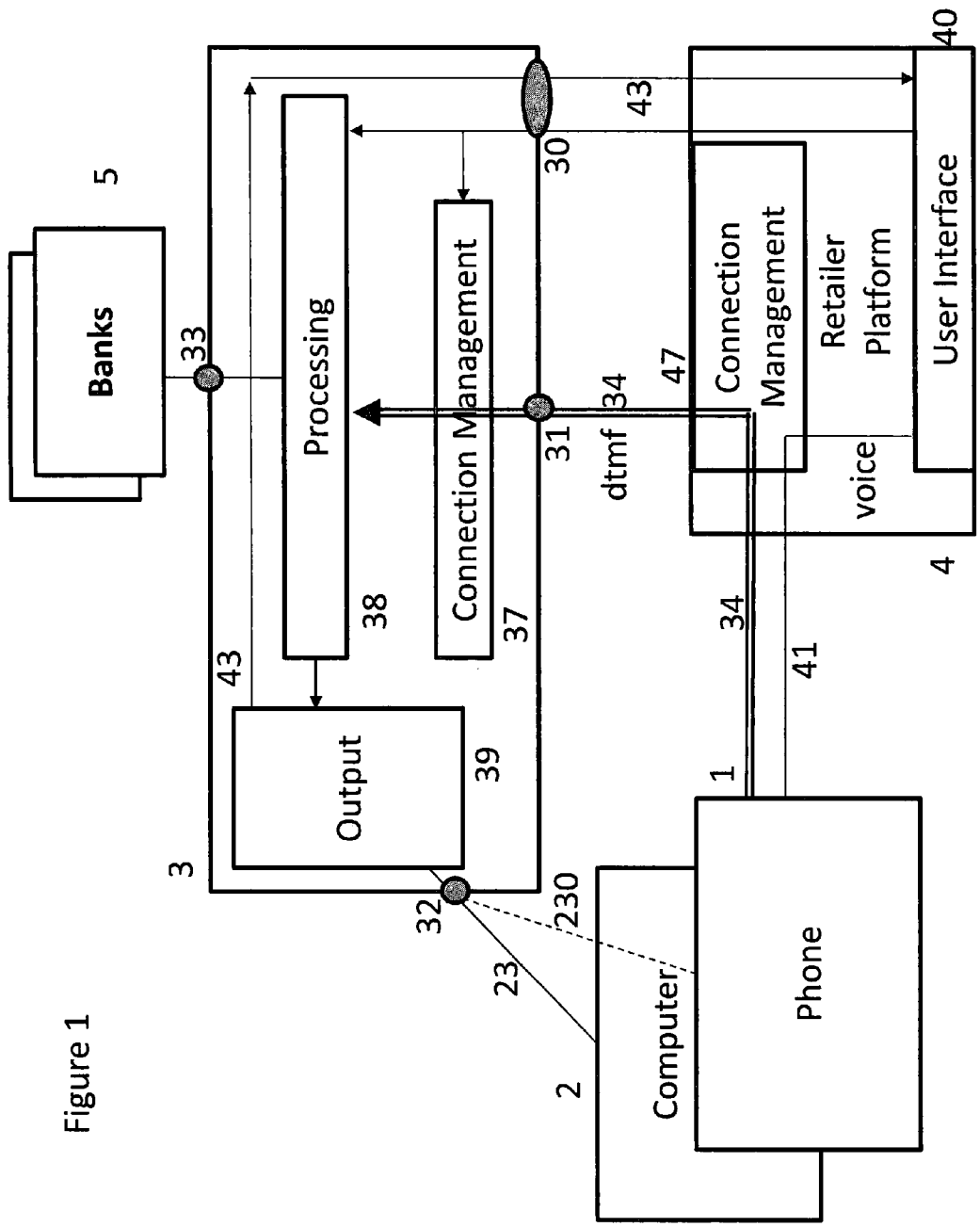
FIG. 1 depicts the various client and server platforms which co-operate to perform the invention.

The caller has a first communications terminal 1, for example a telephone, for communication with the call centre operative, and a second communications terminal 2 for communication with the security platform. These may be separate terminals, communicating over different communications media, or they may be separate functions of a single terminal equipment. The retailer also has a data processing system 4. A secure platform 3 is provided to which both the second terminal 2 and the retailer 4 have limited access, and which is associated with the user's bank 5 or some other trusted third party. The final party to the process is the banking system 5 which is to process payments authorised by the secure system 3.

The retailer's data processing system 4 includes a user interface 40, with which the operative can talk to the customer over the telephone connection 41, and can input and receive data to and from the secure data system 3 over a communications connection 43. The data processing system 4 also includes a call management system 47 which allows the operative to set up a separate connection 34 between the user terminal 1 and the secure system 3 to which the operative does not have access. In the arrangement discussed above with reference to GB patent 2473376, this is achieved by diverting DTMF tones received from the telephone 1 to the security platform 3, whilst allowing voice traffic to still be heard over the user interface 40. It is important to note that with such a system both connections 34, 41 are carried from the telephone 1 over the same physical connection, and the same channel, and thus to the user appear to be a single call. This means that the user cannot tell whether the operative has in fact set up the connection 34, or is in fact still able to receive DTMF traffic over the connection 41, and intercept it for unauthorised purposes. The secure system 3 is configured in such a way that the user can independently verify that the secure connection 34 has indeed been set up.

The secure system 3 comprises a call management system 37 which receives an input from the retailer 4 over a connection 43 at an interface 30, controlling the establishment, through an interface 31, of a separate connection 34 to the customer's telephone 1 and routed by way of the retailer platform 4 in such a way that the operator of the terminal 4 cannot intercept data from that connection. The secure system is also provided with a processor 38 for receiving data inputs from the retailer 4 and the customer's telephone 1 over respective connections 43, 34, through respective interfaces 30, 31 and authorising banking transactions over an interface 33 to the bank processing platform 5.

In addition, the security system 3 has an output system 39 which generates data for output to the retailer by way of the interface 30 and connection 43, and to the customer terminal 1 by way of the interface 31 and connection 34. It also provides further outputs by way of a further interface 32 to a connection 230 to the customer's telephone 1, or by an internet connection 23 to a customer's computer 2, which are independent of the retailer platform 4.

Figure 2:
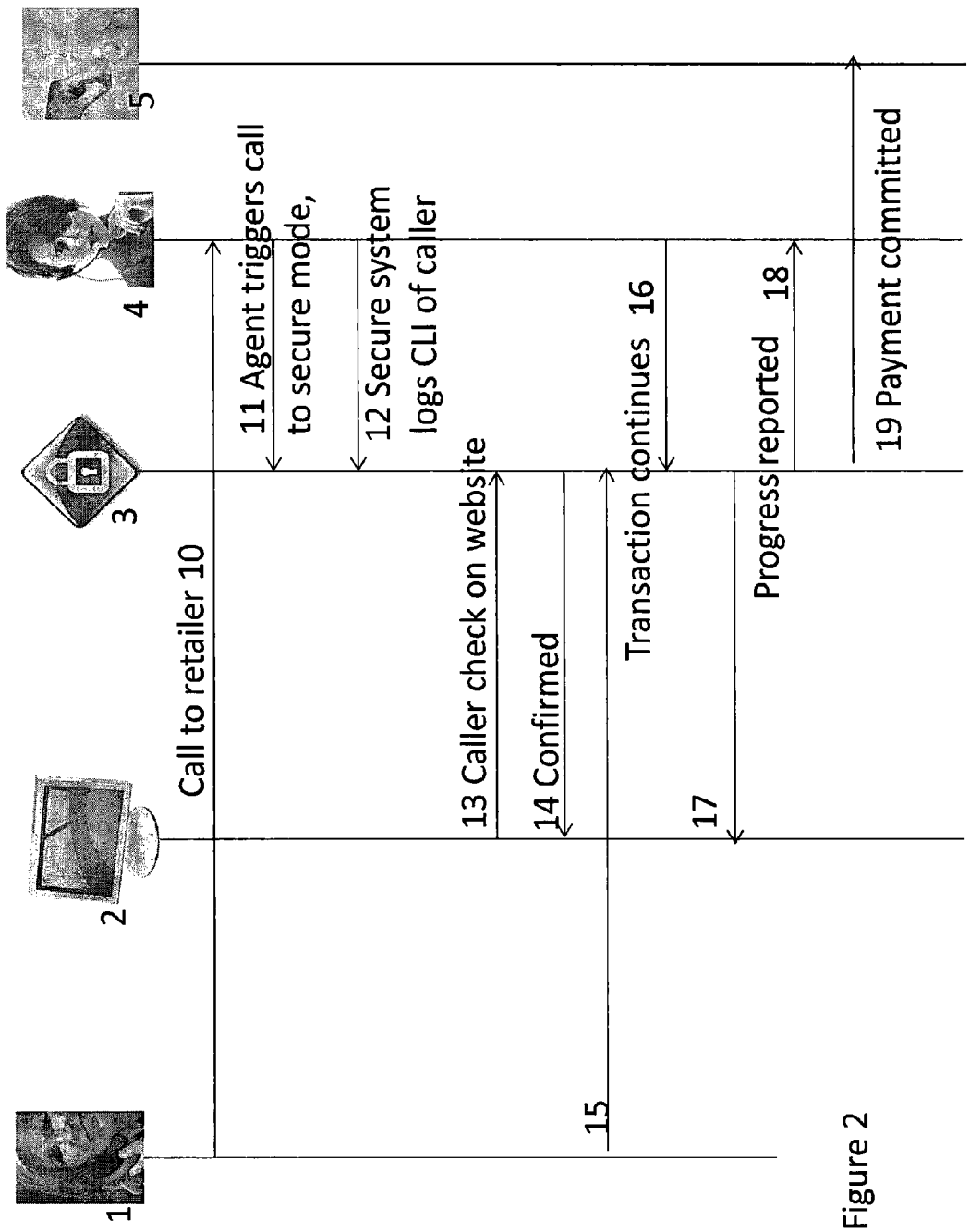
FIG. 2 is a sequence diagram illustrating the various information flows that take place between the caller (payer), retailer (payee) and the service platform in a first embodiment of the invention.

The process depicted in FIG. 2 starts when a connection 41 is made between the caller's telephone 1 and the retailer's platform 4 (step 10). During the transaction, when payment is to be made, the retailers' agent 4 should establish a connection 43 to the security system 43, and a secure connection 34 between the user's telephone 1 and the security system, e.g. by entering a special code on his or her terminal 4 (step 11). This creates a connection 43 between the retailer's platform 4 and the secure platform 3, and also causes the retailer platform to act as a bridge for DTMF signals transmitted from the user's telephone 1 to be intercepted at the retailer platform 4 and forwarded to the secure system 3, without being displayed on the agent's terminal, thereby forming a connection 34 between the user's telephone 1 and the secure system 3 which is not visible to the operator of the terminal 4. The retailer's agent does not have sight of communications carried over this secure connection 34.

A single telephone connection between the user's telephone 1 and the retailer platform 4 is used both for the initial call 41 and one leg of the secure connection 34. When the secure connection 43 is established, the retailer platform diverts DTMF tones to the second leg of the connection 34 so that the human operator of the retailer platform 4 cannot access them. However, as only one physical connection is present at the telephone 1, the customer of that terminal 1 cannot directly detect whether the operator of the platform 4 has in fact set up the secure connection 34. The present invention is concerned with confirming to the customer 1 that such a connection 34 has indeed been created, and that the DTMF tones transmitted by the customer's telephone 1 cannot be detected by the operator of the retailer platform 4 so that the retailer's agent is not able to intercept and misuse the customer's bank details.

In order to do this, when the secure connection 34 is set up, the security system 3 identifies the calling line number of the telephone 1 through which the purchaser is connected to the secure platform 3 over the connection 34. The calling number will therefore only be known to the secure system 3 if the call has been secured (i.e if step 11 has been performed).

The customer can now determine whether the retailer's agent 4 has secured the call, and therefore will not have sight of the customer's account details, by checking with the security system 3 that the system has received the CLI details. If the caller has a second terminal 2 with access to an internet connection 23, he can access a publicly accessible website for the security system 3 (step 13), and which returns on screen a result status that the call is indeed secured (step 14). The user may simply enter his telephone number so that the website can confirm that the CLI in question is on a secure call to the retailer platform 4. If the call has not been secured, the calling number would not be known to the secure system 3 and it can return a related result status (step 140). Access to the website may be subject to security passwords etc to ensure privacy, for example to prevent other parties observing that the customer 1 (identifiable by the CLI) is conducting a transaction with the retailer 4.

Figure 3:
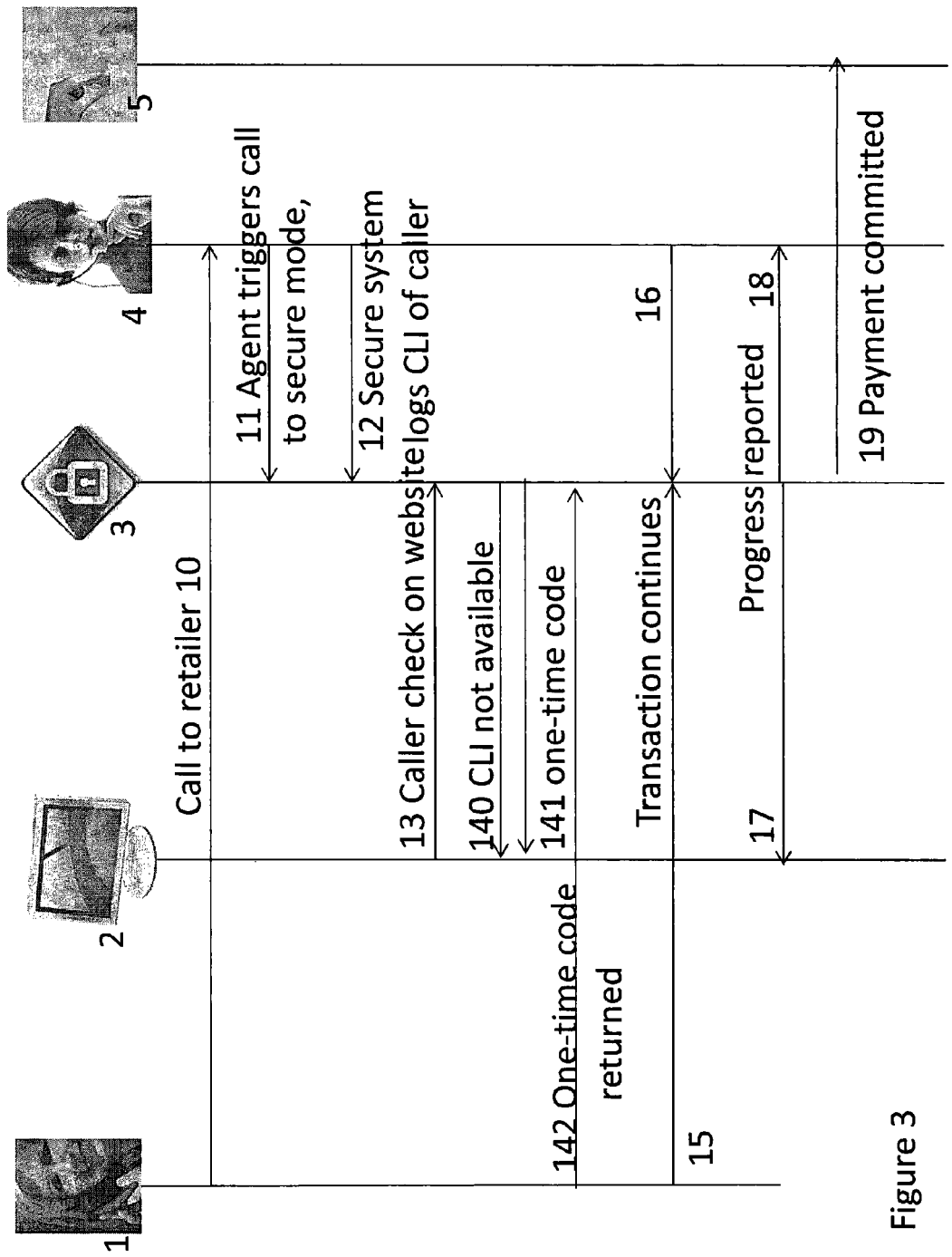
FIG. 3 is a sequence diagram illustrating the various information flows that take place between the caller (payer), retailer (payee) and the service platform in a second embodiment of the invention.
Figure 4:
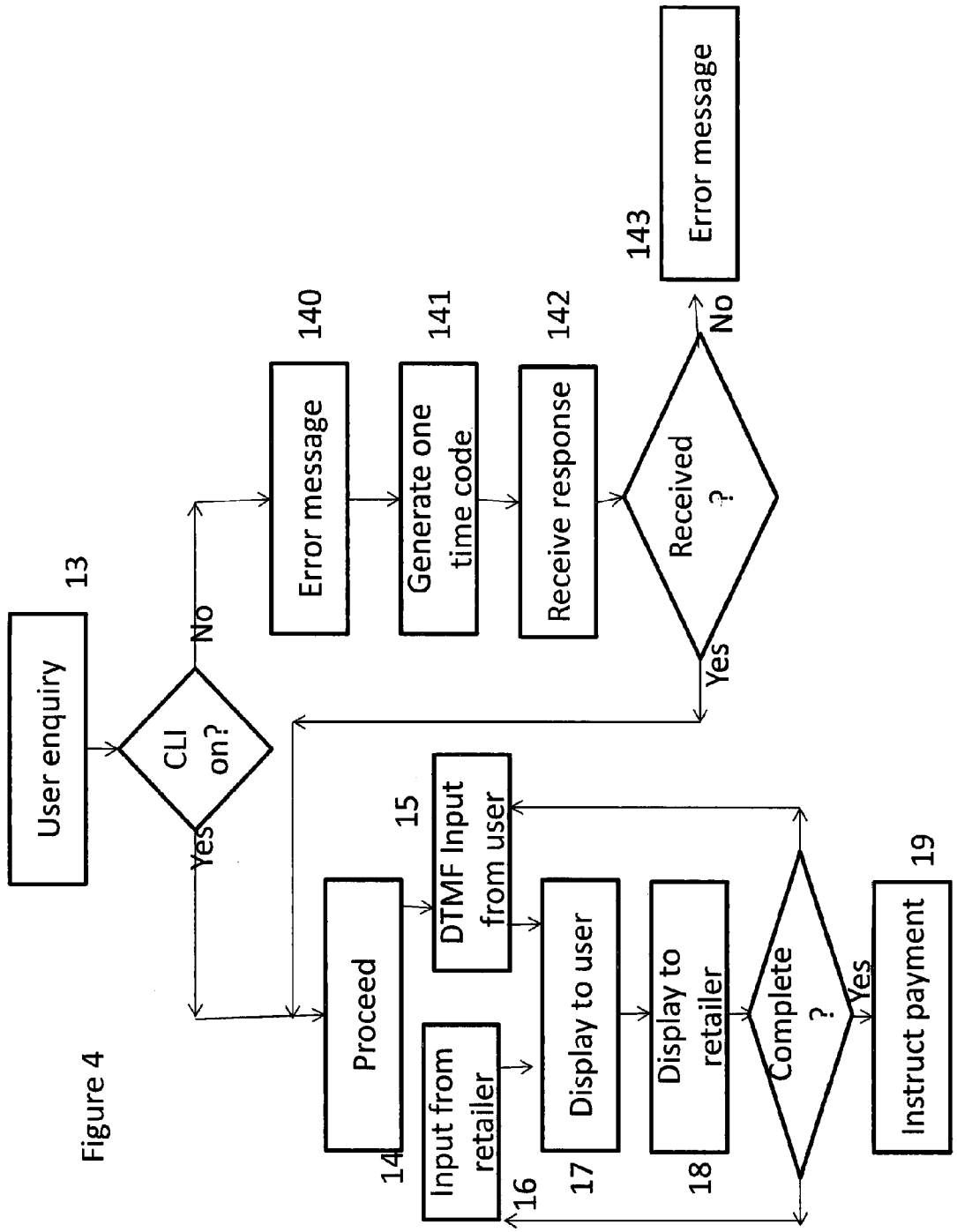
FIG. 4 is a flow chart indicative of the processes taking place in the secure system.

In the event of a user calling from a corporate network or some other connection from which the CLI cannot be identified by the retailer's service platform 4, an alternative approach can be provided, as depicted in FIG. 3. The user 2 accesses the same website and receives an indication that the calling line is not known (step 140). The secure system 3 then generates a random "one time" code, e.g. *141* (step 141), which the user then types on the keypad of his telephone for transmission to the secure platform 3 (step 142).

As the retailer platform 4 has activated the connections 34, 43 to the secure system 3, the DTMF code 142 is forwarded to the secure system 3 and is not detectable by the agent 4, confirming to the secure system 3 that the secure connection 34 has been created. It would not be possible for another party, observing the website associated with the original call, to use the one-time code because the secure system will only recognise inputs arriving by way of a secure connection 34 by way of the retailer platform 4.

In a further alternative, the user could press a code on the telephone handset 1, prompting the secure server 3 to generate an audio output 141 (e.g a speech-synthesised sequence of random numbers) for transmission over the secured connection 34 through the retailer platform. The user then types this sequence on his second terminal 2 for transmission to the security system 3 over the internet connection 23 (step 142) or, if the user does not have access to the Internet, the same can be done by making a second telephone call 230 (which may made on the same phone 1 by putting the call 34/41 on hold) to a trusted telephone number associated with the secure website 3 (e.g advertised in the user's bank's publicity) to transmit the information to the secure server 3.

Failure to establish he secure connection results in an error message 143 indicating that the establishment of the secure connection 34 cannot be confirmed.

Once the connection 34 is established, the transaction may now be completed (step 15, 16) by the two parties 1, 4 entering the required data over the respective links 34, 43 to the secure system 3, with any appropriate verification from the customer's bank 5.

The secure server 3 can provide information over the connections 23, 43 to both parties 2, 4 relating to the progress of the transaction (steps 17, 18), including capturing of the credit card details (masking any secure data such as credit card numbers) and showing the amount being paid in clear text, so that both parties can confirm that the transaction has been completed, and the correct amount is to be deducted from the customer's credit card and credited to the retailer's account. Once both parties have confirmed the transaction, the secure platform transmits instructions 19 to the users' bank accounts 5 to transfer funds.

What is claimed is:

1. A data security platform for processing data associated with a telephone call, the data security platform comprising:
   a first data interface for receiving and transmitting first data signals to and from a first data connection,
   a second data interface for receiving second data signals from a second data connection separate from the first data connection,
   a third data interface for receiving and transmitting third data signals to and from a third data connection, and
   a connection management system, responsive to commands received over the first data connection to establish a second data connection, for generating an output for transmission over the third data connection indicative of the existence of the second data connection;
   wherein the connection management system is arranged to transmit a challenge message over either the second data connection or the third data connection, and to receive a response to the challenge message over the other of the second data connection or the third data connection, indicative that the termination of the second connection and the termination of the third connection are under the control of the same person.

2. A data security platform according to claim 1, wherein the connection management system is arranged to identify a calling line identity of the second data connection and output the calling line identity over the third data connection.

3. A data security platform according to claim 1 wherein the third data connection is an internet connection.

4. A data security platform according to claim 1 wherein the third data connection is a telephone connection.

5. A data security platform according to claim 1, wherein the first data connection and the second data connection are both connections to a first termination point, the second data connection being arranged by the first termination point to be securely forwarded from a second termination point such that it cannot be intercepted at the first termination point.

6. A method of processing data associated with a telephone call, wherein at least:
   first data signals are transmitted between a security system and a first termination over a first data connection,
   the first termination transmits command data to the security system to establish a second data connection between the security system and a second termination, the second data connection being routed by way of the first termination, the second data connection being a telephone connection arranged to carry second data signals,
   the security system is arranged to generate an output on a third data connection independent of the first termination indicative of the existence of the second data connection,
   the security system transmits a challenge message over either the second data connection or the third data connection, and receives a response to the challenge message over the other of the second data connection or the third data connection, indicative that the termination of the second connection and the termination of the third connection are under the control of the same person.

7. A method according to claim 6, wherein the security system identifies a calling line identity of the second data connection and outputs the calling line identity over the third data connection.

8. A method according to claim 6 wherein the third data connection is an internet connection.

9. A method according to claim 6 wherein the third data connection is a telephone connection.

10. A method according to claim 6, wherein the second data connection is arranged by the first termination point to be securely forwarded from the second termination point such that it cannot be intercepted at the first termination point.

* * * * *